United States Patent [19]

Weishaar et al.

[11] 4,145,281
[45] Mar. 20, 1979

[54] WATER PURIFICATION PROCESS

[75] Inventors: Michael F. Weishaar, Ballwin; F. Leon Ballard, Manchester, both of Mo.

[73] Assignee: Monsanto Company, St. Louis, Mo.

[21] Appl. No.: 752,334

[22] Filed: Dec. 20, 1976

[51] Int. Cl.² .............................. C02B 1/42; C02B 1/56
[52] U.S. Cl. ................................. 210/37 B; 210/38 B; 423/54; 423/100; 423/607
[58] Field of Search .................. 210/30 R, 32, 37 B, 210/38 B; 423/54, 100, 595, 607

[56] References Cited

U.S. PATENT DOCUMENTS

| 3,658,470 | 4/1972 | Zievers et al. | 210/37 B |
| 3,664,950 | 5/1972 | Saraceno et al. | 210/37 B |
| 3,725,259 | 4/1973 | De Pree | 210/30 R |
| 3,972,810 | 8/1976 | Chopra | 210/37 B |

*Primary Examiner*—Charles N. Hart
*Assistant Examiner*—Ivars Cintins
*Attorney, Agent, or Firm*—Herman O. Bauermeister; John D. Upham

[57] ABSTRACT

Process for the removal of chromium and zinc corrosion inhibitor compounds from cooling tower blowdown streams, comprising contacting the water of said streams first with a weakly basic anion exchange resin and then with a weakly acidic cation exchange resin.

1 Claim, 1 Drawing Figure

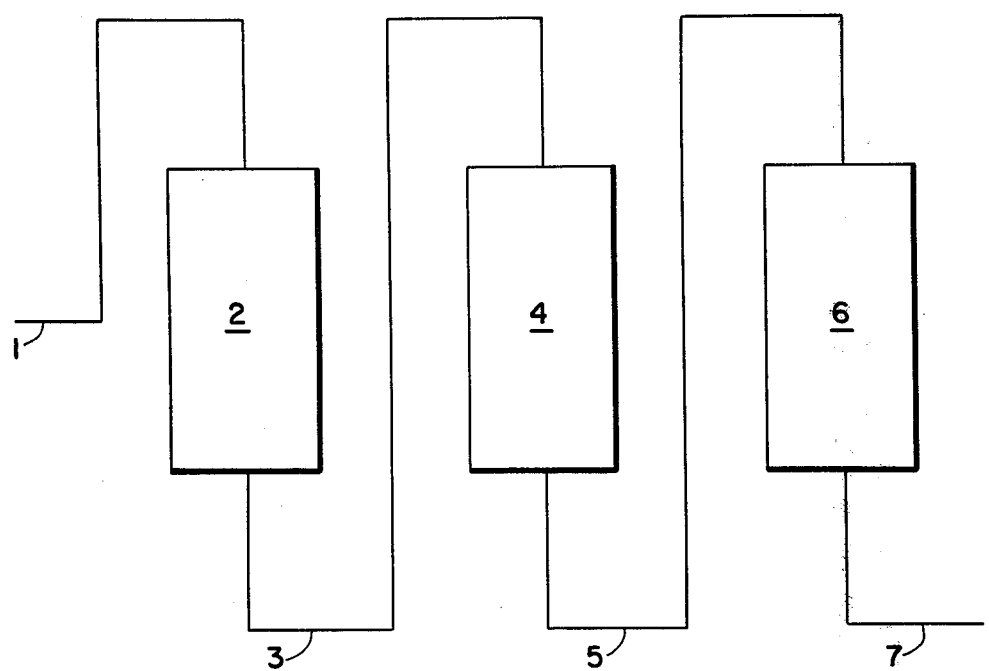

WATER PURIFICATION PROCESS

BACKGROUND OF THE INVENTION

This invention relates to a process for the removal of chromium compounds, particularly for combination with zinc compounds from water, such as from industrial water, for example cooling tower blowdown, wherein the chromium and zinc compounds present as corrosion inhibitors are removed from the water stream and, if desired, reused.

Water is commonly used as a heat transfer media in a variety of industrial systems. These waters frequently are high in dissolved solids, are corrosive and must be obtained from a wide variety of sources. To overcome the corrosive tendencies of these waters, it is customary to treat them with corrosion inhibiting chemicals to render them less-corrosive to the various metal components of heat exchange and cooling systems. When these waters are circulated through cooling towers, losses of water due to evaporation and windage result. Due to these losses the dissolved solids and corrosion inhibitors tend to concentrate to an undesirable level. When a cooling tower which has been treated with chromate and zinc corrosion inhibitors reaches a certain concentration level of dissolved solids, it is customary to blow it down by discharging a portion of the water and adding thereto fresh makeup having a lower dissolved solids content. Frequently such blowdown waters contain from 1-200/parts per million of chromate and zinc compounds. The blowdown may contain as much as 200 parts per million of chromate and many times that amount of other dissolved salts, such as alkali metal chlorides, sulfates, carbonates, nitrates and the like. Typical cooling tower blowdown water may contain, for example, 20 parts per million of a chromate salt and 1200 parts per million of other dissolved salts such as sodium chloride, calcium sulfate, magnesium carbonate, zinc salts and the like. The total hardness is typically 100 to 1500 ppm expressed as $CaCO_3$.

Aqueous solutions of chromate and zinc compounds have proven far superior to other products as fouling and corrosion inhibitors in process cooling water systems. Currently available non-chromate water inhibitors have not proven reliable to meet the severe service requirements demanded in the chemical, petrochemical and refinery industries. In smaller systems less sensitive to fouling, non-chromate inhibitors have proven adequate. However, both chromate and non-chromate inhibitor treatment chemicals can present a potential source of contamination to receiving waters. Environmental restrictions on heavy metal discharges in water effluents may therefore require use of treatment programs to remove the heavy metal compounds.

In order to utilize the more reliable, lower risk, preferred heavy metal corrosion inhibitors such as chromium and zinc compounds and not exceed heavy metal limitations in its plant effluent due to cooling tower blowdown, a method of removing the heavy metals from the blowdown is necessary. Removal of chromates from waste water by ion exchange has been known to the process industries for more than thirty years. This can be accomplished by passing waste waters containing chromates and other dissolved salts through a weak base anion exchange resin in the salt form, permitting the selective removal of the chromate ion from the cooling tower blowdown, and its recovery for subsequent reuse as recovered inhibitor in cooling tower operation. Later, in U.S. Pat. No. 3,223,620, strong base anion resins were used because of their high loading capacities per cubic foot of resin. However, the resins require both a salt and a caustic chromate elution step which results in an eluate that is not totally satisfactory for reuse because of the salt content.

Development of more efficient and fouling resistant macroreticular weakly basic ion exchange resins, which require elution of the chromate with caustic alone, aided in meeting the service requirements demanded of a reliable efficient chromate removal/reuse ion exchange process.

It has now been discovered that the chromium, although charged as the chromate for corrosion inhibition, actually is transformed in part to chromium compounds, e.g. (chromic and chromous chloride). This is unexpected since the chromates which are charged to the unit would be expected to be oxidizing agents, thus maintaining the chromium as chromate ions instead of forming chromium cations, principally chromic ions.

The National Pollution Discharge Elimination System (NPDES) discharge permits are not limiting on $Cr^{+6}$ alone, but on total chrome with no differentiation between the various species in which a metal may occur. Therefore in addition to $Cr^{+6}$, chromium cations, particularly trivalent chrome, and in many cases zinc, must also be removed. As discussed above, prolonged operation results in trivalent chromium being present and this must also be removed. A presentation at the Cooling Tower Institute Annual Meeting in Houston, Texas, in February 1975, "Recovery of Chromate from Cooling Tower Blowdown by Ion Exchange Resins," by D. Yamamoto et al, describes a process wherein the blowdown containing hexavalent chromate was passed first through a weakly acidic cation exchange column and then through a weakly basic anion exchange column. The hexavalent chromate level in the blowdown was effectively controlled; however, only 60% of the zinc was removed. No mention has been made of trivalent chromium removal in the prior art.

It is, therefore, an object of this invention to overcome the above disadvantages and provide an improved process which controls not only hexavalent chromium levels, but also zinc and trivalent chromium levels. It is also desirable that the resins utilized be resistant to oxidation and fouling.

The following description will serve to make apparent to those skilled in the art the process by which the above objects can be achieved.

SUMMARY OF THE INVENTION

In accordance with the present invention, the waste water from cooling tower blowdown is preferably first prefiltered to remove suspended material. The pH of the blowdown is then controlled for example within a range of 4.5 to 4.9, such as by addition of a mineral acid, e.g. hydrochloric acid or sulfuric acid. The blowdown is then passed through at least one weakly basic ion exchange resin bed to remove hexavalent chromium. Zinc and trivalent chromium are removed by then passing the blowdown through at least one weakly acidic cation exchange resin bed in the alkaline form, alkaline being herein defined as sodium, calcium, potassium or magnesium.

This is in contrast to the use of the cation exchange resin in the acidic or hydrogen form. After continued usage the anion and cation resins may then be regenerated, and chromium and zinc compounds may be recovered during regeneration of each column and either used in other processes or stored for reuse as corrosion inhibitors for cooling towers.

DESCRIPTION OF THE DRAWING

In the accompanying drawing there is shown a schematic flow diagram illustrating an embodiment of the present invention. The drawing illustrates a flow sheet of the process. The water to be treated enters at line 1, and is passed through a pressure sand prefilter 2. The water then passes through line 3 to the weak base anion exchange column 4, then leaving by line 5 to pass through the weak acid cation exchange column 6. The treated water leaves by line 7.

DESCRIPTION OF THE PREFERRED EMBODIMENTS

For purposes of this invention, the suspended solids and organic matter present in the cooling tower blowdown are preferably first removed. Filters are useful for this purpose. Backwash of the filters may be automatic based on a predetermined pressure drop across the filter bed. Such prefiltration helps to prevent channeling and clogging in the ion exchange beds and thus keeps the length of a run at a maximum based on chromium and zinc analyses, to maintain optimum operation at proper loading and avoidance of channeling.

Following filtration, the cooling tower effluent is passed through one, two or more anion exchange columns. Hexavalent chromium, existing as chromate and dichromate, is removed from cooling tower blowdown by passing it through an acidified weakly basic anion exchange resin, e.g. in the chloride or sulfate form. In order for hexavalent chromium to be removed effectively, the exchange functional groups on the resin must be converted from the free base form to the acid form at start-up and after regeneration (Equations 7 or 8 below). The resin is converted to the acid form by passing either sulfuric or hydrochloric acid through the resin bed after regeneration with sodium hydroxide.

The ion exchange reactions for removal of hexavalent chromium are:

1. Dichromate removal with the weak base anion exchange resin in the sulfate form:

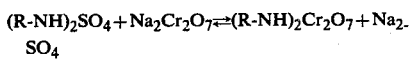

$(R-NH)_2SO_4 + Na_2Cr_2O_7 \rightleftharpoons (R-NH)_2Cr_2O_7 + Na_2SO_4$

2. Dichromate removal with the weak base anion exchange resin in the chloride form:

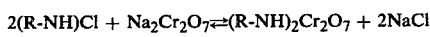

$2(R-NH)Cl + Na_2Cr_2O_7 \rightleftharpoons (R-NH)_2Cr_2O_7 + 2NaCl$

3. Chromate removal with the weak base anion exchange resin in the sulfate form:

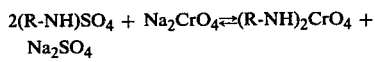

$2(R-NH)SO_4 + Na_2CrO_4 \rightleftharpoons (R-NH)_2CrO_4 + Na_2SO_4$

4. Chromate removal with the weak base anion exchange resin in the chloride form:

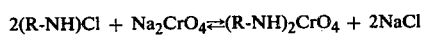

$2(R-NH)Cl + Na_2CrO_4 \rightleftharpoons (R-NH)_2CrO_4 + 2NaCl$

Equations showing the recovery and removal of dichromate and chromate in the regeneration of the weak base anion exchange resin after exhaustion are as follows:

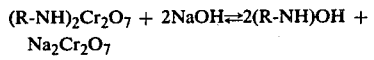

$(R-NH)_2Cr_2O_7 + 2NaOH \rightleftharpoons 2(R-NH)OH + Na_2Cr_2O_7$   5.

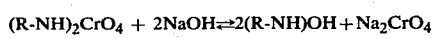

$(R-NH)_2CrO_4 + 2NaOH \rightleftharpoons 2(R-NH)OH + Na_2CrO_4$   6.

The following are equations showing the conversion from the free base form to the chloride and sulfate form for weak base anion exchange resins:

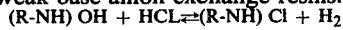

$(R-NH)OH + HCL \rightleftharpoons (R-NH)Cl + H_2$   7.

$2(R-NH)OH + H_2SO_4 \rightleftharpoons (R-NH)_2SO_4 + H_2$   8.

Higher hexavalent chromium loadings are achieved when the chromium exists as dichromate ion rather than chromate ion in the blowdown. Equations 1 through 4 show that the resin can be loaded with two times as much hexavalent chromium when contacted with dichromate ions as opposed to chromate ions. Cooling tower recirculation flows are generally operated between pH 6.0 and 7.0. At this range of acidity the hexavalent chromium will exist as both chromate and dichromate.

Weakly basic anion exchange resins are selected for use because of their high chromate removal capacity, chemical and physical stability in a chromate environment, low chromate leakage, economical regeneration cost and resistance to fouling. Among the weakly basic resins which may be selected are Duolite A-2, Duolite A-3 and Duolite A-4, A-5, and A-117 of Chemical Process Co., Amberlite IRA 45 and 47, IRA 68 and Amberlite IRA-93 and 94 of Rohm and Haas Co., Dowex 3 of Dow Chemical Co., Ionac A-260 of American Zeolite Co., Montecatini A-200 of the Montecatini Co., and Kaken Kagaku KK No. 12. These and other weakly basic resins which may be used are discussed in *Ion Exchange Resins,* Robert Kunin, Krieger Pub. Co., Huntington, N.Y., 1972. The present process is particularly useful with water containing large amounts of total dissolved solids, e.g. with a hardness of 100 to 1500 ppm expressed as $CaCO_3$.

The following examples illustrate representative embodiments of the invention but are not limitative of the scope of the invention.

EXAMPLE 1

In the present method of operation the blowdown is passed through one or optionally, two anion columns in series. When two columns are used, the first column is the primary, the other the secondary or polisher column. When the effluent from the secondary column has a leakage of hexavalent chromium of 0.3 ppm, or a total chromium concentration of 0.5 ppm, the primary column is taken off line and regenerated. After the primary column is taken off line the secondary column becomes the new primary column. The original primary column is placed back on line as the secondary column after regeneration.

A run is operated at 1800 bed volumes (BV's-the volume of ion exchange resin contained in a column) at an influent total dissolved solids concentration of 1200 ppm and a hexavalent chromium concentration of 10 ppm at a flow rate of 3.0 GPM per cu. ft. of resin. The resin capacity under these conditions is approximately 1.0 pound of hexavalent chromium per cu. ft. of resin. During the run, acidification of the water occurs, with the pH reaching to about 4.0 to 5.4.

To regenerate the weak base anion resin, 10 bed volumes of raw water are backwashed to effect 100% expansion of the resin bed for 30-50 minutes. This step is necessary to break up the bed, which compacts between regenerations, and to remove any particulate matter which may have accumulated.

Since the column contains cooling tower blowdown when it is taken out of service, it is necessary to backwash the column in two steps. The first is a wash (approximately 0.5 GPM/cu. ft. of resin upflow or 3.0 GPM/cm. ft. of resin downflow) to displace the chrome laden blowdown. The effluent from the column during this wash is returned to the blowdown collection sump. The backwash then follows at a flow rate of 1.5-2.2 GPM/cu. ft. and continues for 30-50 minutes to break up the resin bed and remove particulate matter.

Next, 4.0 bed volumes of raw water (at 30 GPM/cu. ft.) downflow is injected into the column to displace the treated flowdown remaining in the column after backwashing in order to keep precipitation within the bed at a minimum, when the regenerants are injected into the column.

In the caustic regeneration sequence, 2.4 bed volumes of NaOH, recovered from previous regenerations, are injected (downflow) at a rate of 0.25 GPM (cu. ft. of resin). The first 1.5 bed volumes of effluent are returned to the blowdown collection sump. The remaining 0.9 bed volume is collected as recovered chromate in the chromate recovery tank.

Next, 2.0 bed volumes of fresh 4.0% NaOH are injected (downflow) at 0.25 GPM/cu. ft. of resin. The first 1.1 bed volumes are recovered as chromate, the final 0.9 bed volume is recovered as NaOH. These recoveries are then returned to the appropriate recovery tanks.

In order to convert a large percentage of the ion exchange sites from the hydroxyl form to the acid ($SO^{4--}$ or $Cl^-$) form, either 1.25-1.5 bed volumes of 5% $H_2SO_4$ or 0.9-1.1 bed volumes of 5% HCl are injected at a downflow of 0.25 GPM/cu. ft. of resin. The bed is then slowly rinsed (downflow) with 1.5 bed volumes of softened water at 25 GPM/cu. ft. of resin to flush the acid previously injected.

The column is next backwashed with 5 bed volumes of raw or softened water at 1.5-2.2 GPM/cu. ft. of resin in order to remove any ion precipitate before the ion exchange bed is placed back in service. The water is drained from the ion exchange column to within 2.0 ft. of the top of the bed. Next, the bed is air mixed for 20 minutes with 5 psi at a flow rate of 5 cu. ft. per min. per sq. ft.

At this point in the regeneration it is assumed that the upper 75 to 95 percent of the resin bed is in the $SO_4^{--}$ or $Cl^-$ form and the lower 5 to 25 percent in the hydroxyl ($OH^-$) form. As resin beads having $OH^-$ ions attached to them come into contact with resin beads having $SO_4^{--}$ or $Cl^-$ ions attached, the different ions are exchanged. The end result is a homogeneous bed containing $OH^-$ and $SO_4^{--}$ or $Cl^-$ ions. The $OH^-$ ions are left on the bed to buffer the pH of the effluent from the anion column.

Finally, the column is refilled with 2.5 BV's of raw water at 1.5 GPM/cu. ft. of resin and ten minutes is allowed for the resin to settle and return to the service mode as the secondary anion column.

In the case of weak base anion resin regeneration, the recovery of a high quality chromium and sodium hydroxide effluent is a primary consideration when determining the cutoff points. Sample concentrations indicate that the first 1.50 bed volumes of recovered caustic feed effluent need not be collected as recovered chromium because of the low total chromium concentration (25 ppm). Recovered chromium should start to be collected for the next 2.0 bed volumes. Note that since only 2.40 bed volumes of recovered caustic are fed to the anion resin initially in the regeneration sequence, by the time chromium recovery is complete, fresh 4.0% sodium hydroxide is being fed to the column as the second chemical of the regeneration process.

Immediately following the collection of recovered chromium, sodium hydroxide recovery can commence. Recovery will proceed for the next 2.40 bed volumes or until a total of 5.90 bed volumes of regenerants and rinses have been fed to the weak base resin. The recovered sodium hydroxide is stored and reused as the initial chemical fed during the following anion regeneration sequence.

After the removal of hexavalent chromium, zinc and trivalent chromium must be removed. It has been found that immediately following the return to service of a freshly regenerated recording anion exchange column there is a surge in the concentration of trivalent chromium as a "spike" which may exceed 5 ppm. It has been found that the placing of the cation column after the anion columns will serve to level this "spike."

For removal of the zinc and trivalent chromium, a weakly acidic cation exchange resin is employed. Such a resin is economical in regeneration costs, attrition resistant and not easily damaged by swelling. Among typical weakly acidic cation exchange resins which may be used in the column are Amberlite DP-1,IRC 72,IRC50 and IRC 84 of Rohm and Haas Co., Duolite CS-100 of Chemical Process Co., Lewatit CNO, Lewatit C of Bayer Farben Co., Wolfatit-C, Wolfatit CN, Wolfatit CP-300, Wolfatit KSB of Wolfen-Farben Co., IMAC-18 of IMACTI Co., Ionac C265 and C-270 of American Zeolite Co., Permutit C, Permutit H, Permutit H-70, Permutit 216, Zeo-Carb 216 of Permutit Co., and others which are evaluated in Kunin's book, "*Ion Exchange Resins,*" discussed above.

The resin requirements are based on one cu. ft. of resin per three gallons per minute of blowdown. A higher flow rate such as 4.5 GPM/cu. ft. of resin can be passed through the bed for short periods of time. The increased flow rate proportionately decreases run length, but zinc will continue to be removed below preferred standard limits of 0.5 ppm.

To remove zinc to low levels, such as below 0.5 ppm it has now been found desirable to convert the exchange sites on the resin beads from the hydrogen form to the alkaline form after regeneration with $H_2SO_4$ or HCl. When the resin is in the hydrogen form it can remove cations which are equivalent to the alkalinity present in the water and split part of the neutral salts in the pH range above 3.5 as shown in the following ion exchange reactions:

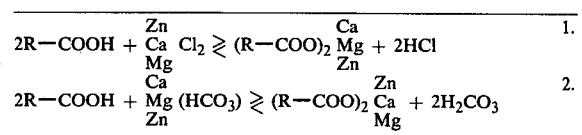

It has been found that 60 percent of the zinc could be removed from the blowdown by using a weakly acidic cation exchange resin in the hydrogen form. However it has now been found that when the weakly acidic ion exchange resin is converted to the alkaline form, it can achieve 90% removal of zinc. The following equations denote the reactions taking place on the resin:

$$2R\text{-}COONa + CaSO_4 \rightleftarrows (R\text{-}COO)_2 Ca + Na_2SO_4 \quad 1b.$$

$$2R\text{-}COONa + ZnSO_4 \rightleftarrows (R\text{-}COO)_2 Zn + Na_2SO_4 \quad 2b.$$

$$(R\text{-}COO)_2 Ca + ZnSO_4 \rightleftarrows (R\text{-}COO)_2 Zn + CaSO_4 \quad 3b.$$

It has been found that the selectivity for multivalent cations is much greater for a weak acid resin than the strong acid (sulfonic type) resin. Because of this selectivity, the weak acid resin cannot be regenerated with NaCl and must be regenerated with both acid and alkali as shown in the following:

$$(R\text{-}COO)_2 Zn + H_2SO_4 \rightleftarrows 2(R\text{-}COOH) + ZnSO_4 \quad 3a.$$

$$R\text{-}COOH + NaOH \rightleftarrows R\text{-}COONa + H_2O \quad 3b.$$

The weakly acid cation column is used in alkali form (Ca or Na).

It has been found that a desirable position to locate the cation column is after the anion column, not before as has been done in the prior art. The weakly acidic cation exchange resin as the last bed acts as a scavenger, by removing hydrogen ions from the blowdown. This helps keep the pH of the effluent within the preferred pH limitations of 5.0 to 10.0. Moreover, with the cation following the anion column most of the suspended matter is removed before it can contact the cation resin bed. This decreases the possibility of premature regeneration due to increased head loss and channeling due to suspended solids accumulation on the bed.

After the blowdown has been passed through the cation column, the column is regenerated. Assuming 1 BV retention across the column, the column is slowly washed with treated blowdown for 10.0 minutes at 3.0 GPM per cu. ft. resin, then backwashed with treated blowdown for 30 minutes at 2.4 GPM per cu. ft. of resin. Any treated blowdown remaining in the column after backwash is displaced with 4.0 BV's of raw water down flow at 3.0 GPM/cu. ft. of resin.

In this regeneration sequence, 16 BV's of 0.75% $H_2SO_4$ at 1.0 GPM per cu. ft. of resin is fed through the column followed by one bed volume of 5.0% $H_2SO_4$ at 0.33 GPM/cu. ft. of resin. The first 2.0 bed volumes of effluent are returned to the blowdown collection sump. The remaining effluent is collected as recovered zinc solution.

The bed is next slowly rinsed with 0.5 bed volumes of softened water at 0.33 GPM per cu. ft. of softened water at 0.33 GPM per cu. ft. of resin. The effluent is collected and removed from the process. Following this, there is a holding period of 30 minutes to allow the hydrogen ions to be absorbed into the resin. Then slow rinsing is continued with 3.0 bed volumes of softened water at 0.33 GPM/cu. ft. of resin. There follows another twenty minute holding period to allow the sodium ions to be absorbed into the resin. Slow rinsing is again continued with 1.0 bed volumes of softened water at 0.37 GPM/cu. ft. of resin, followed by a final fast rinse with 9.0 BU's of softened water at 1.0 GPM/cu. ft. of resin.

In weak acid cation resin regeneration, zinc recovery is of primary importance. The first 2.0 bed volumes of effluent contain little zinc (25ppm). After the 2.0 bed volume point, the major zinc recovery begins and continues for the next 14.0 bed volumes. Zinc recovery can stop after 16 bed volumes. In all, 16.0 bed volumes of 0.75% $H_2SO_4$ and 1.0 bed volumes of 5.0% $H_2SO_4$ are fed to the resin bed.

EXAMPLE 2

The procedure followed is described in the above description of a preferred embodiment (1200 ppm $CaCO_3$ hardness). The resin used in the anion column is Rohm and Haas IRA-94, a macroreticular, weakly basic anion exchange resin containing tertiary amine functionality on a styrene-divinylbenzene atrix. Rohm and Haas DP-1, a macroreticular, weakly acidic, cation exchange resin, based upon a cross-linked methacrylic and acid copolymer is used in the cation column.

Atomic absorption is used to determine chromium and zinc levels in test solutions. A Perkin-Elmer Model 403 instrument with direct readout is used. Acidity is determined by titration to a bromothymol blue endpoint with NaOH. Samples are taken from points 1, 3, 5, and 7 of the flowsheet of the drawing. The amount of hexavalent chromium solution is reduced from 9.0 ppm at point 1 to 0.25 ppm at point 7. This is well below the 0.5 ppm standard desired.

The zinc in solution remains constant at 3.0 ppm between points 1 and 5. The amount of zinc in solution is reduced to 0.25 ppm between points 5 and 7. This is lower than the usual standard of 0.5 ppm and is evidence of the ability to remove 90% of the zinc in solution. Prior workers in the art have achieved only 60% removal.

The pH of the solution at point 7 is 6.0–6.2. This value is within the range of 6 to 10 for effluents discharge. It has been found that by placing the cation column after the anion columns, effluent pH can be controlled to within a pH range of 5.5–9.0.

EXAMPLE 3

Cooling tower blowdown is treated as in Example 1 and measurements of trivalent chromium are taken at points 1, 5, and 7 after regeneration of the anion columns. The results of these measurements at the 3 points is 3.0, 3.0 and 0.25 ppm Zn ion.

After the regeneration of an anion column and its return to service as the polisher column there is a spike-like increase in the amount of trivalent chromium in solution. The presence of this trivalent chromium in solution has not been previously recognized in the prior art.

Charting of trivalent chromium concentration versus time indicates the trivalent chromium spike before and after the cation column. There is a considerable surge of trivalent chromium after regeneration of the anion column. By placing the cation column after the anion column, this surge can be reduced to below the 0.5 ppm level as chromic ion.

What is claimed is:

1. A process for the selective removal of chromate, chromium and zinc ions from water containing total dissolved solids as total hardness of 100–1500 ppm, expressed as $CaCo_3$, which comprises contacting said water first with a weakly basic anion exchange resin in a sulfate or chloride form, and then with a weakly acidic cation exchange resin in a sodium form.

* * * * *